Patented Dec. 14, 1948

2,456,503

UNITED STATES PATENT OFFICE 2,456,503

CONDENSATION OF KETENES WITH ESTERS OF KETO ACIDS

Hugh J. Hagemeyer, Jr., Kingsport, Tenn., assignor to Eastman Kodak Company, Rochester, N. Y., a corporation of New Jersey No Drawing. Application June 7, 1946, Serial No. 675,304

9 Claims. (Cl. 260—344)

This invention relates to the condensation of a ketene with an ester of a keto acid and more particularly to a process for the preparation of ester lactones by this condensation. The invention also relates to the preparation of unsaturated acids by the decarboxylation of these lactones and to the hydrolysis and alcoholysis of these lactones.

An object of the invention is to provide new ester lactones and a process for their preparation.

Another object is to prepare unsaturated dicarboxylic acids from my novel ester lactones.

Still another object of the invention is to prepare organic compounds by the hydrolysis or alcoholysis of ester lactones.

In accordance with one feature of the invention, these and other objects are attained by condensing a ketene with an ester of a keto acid in the presence of a Friedel-Crafts type catalyst to form an ester lactone.

Because of the great reactivity of ketenes and their tendency to polymerize and because of the relative instability of the resulting beta lactones, it is preferable to carry out the reaction under mild conditions using a relatively low catalyst concentration and low temperatures. To control the rate of reaction, organic diluents may be employed in the reaction mixture. Temperatures below 50° C. are usually desirable, and with the more active type catalysts temperatures as low as —70° C. may be employed.

The invention is further illustrated in the following equation showing the condensation of a ketene with an ester of a keto acid to give an ester lactone of a carboxylic acid ester.

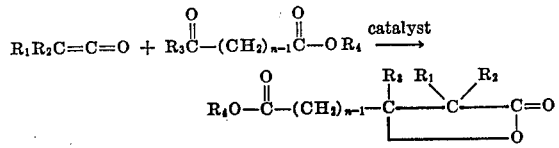

Wherein $n$ represents any whole number, e. g. 1, 2, 3, 4, etc., $R_1$ and $R_2$ each represents hydrogen or hydrocarbon, and $R_3$ and $R_4$ each represents a hydrogen atom, an alkyl group, e. g. methyl, ethyl, etc., an aryl group, e. g. phenyl, benzyl, etc. and an aralkyl group, e. g. phenylethyl, etc.

The simple ketene, $CH_2=C=O$, formed by the pyrolysis of acetic acid or acetone is preferably employed as the ketene in the reaction, but its aliphatic and aromatic homologs including both aldol and keto ketenes may be employed. Desirable esters of keto acids for the reaction include the esters of pyruvic, acetoacetic and levulinic acids. Various Friedel-Crafts type catalysts may be employed, such as halides of boron, zinc, aluminum, tin, titanium, and iron or complexes of these halides with organic compounds such as ethyl ether, ethyl chloride and the like. These catalysts are well known in Friedel-Crafts reactions.

The invention will be more clearly understood from the following examples:

*Example 1*

4 cc. of $BF_3$ etherate catalyst are dissolved in 500 grams of ethyl acetoacetate at 0° C. contained in a reactor adapted for temperature control. Ketene is passed in through a high speed stirrer at a rate of 21 grams/hr. for 16 hours. 412 grams of the lactone of $\gamma$-carboxy-$\beta$-hydroxy-$\beta$-methyl butyric acid were obtained. The reaction is shown in the following equation:

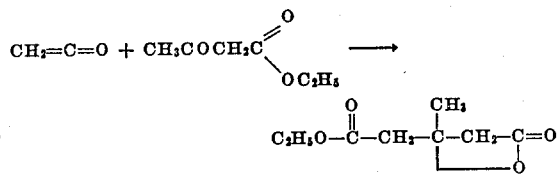

*Example 2*

20 grams of methyl pyruvate in 30 cc. of isopropyl ether containing 1 cc. of boron trifluoride etherate were treated with one mole of ketene at —70° C. for 4 hours. 14 grams of the lactone of $\beta$-carbomethoxy-$\beta$-hydroxy butyric acid was obtained. The reaction is shown in the following equation:

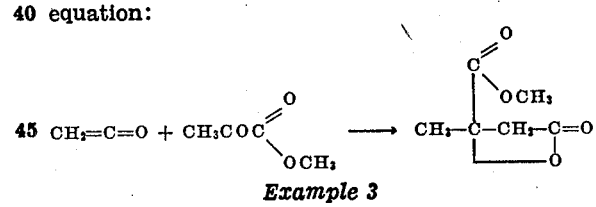

*Example 3*

500 grams of methyl levulinate and 4 cc. of boron trifluoride etherate were chilled at 0° C. and 4 moles of ketene were added through a high speed stirrer at a rate of 0.5 mole per hour. 205 grams of the lactone of δ-carbomethoxy-β-hydroxy-β-methyl valeric acid was obtained. The reaction is shown in the following equation.

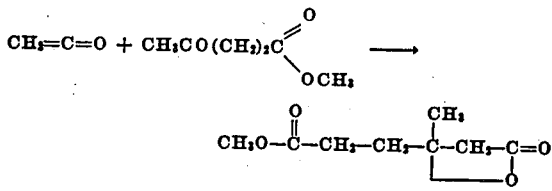

I have found that as the separation of the carbonyl group from the negative effect of the carboxyl group increases, the rate of the reaction increases and a higher conversion is obtained.

In accordance with another feature of the invention, unsaturated acid esters can be prepared by the decarboxylation of the ester lactones of carboxylic acid esters of the type made as just described. The general equation may be shown as follows:

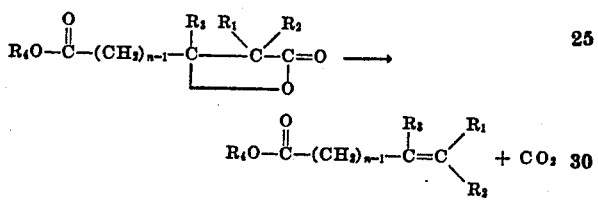

in which $R_1$, $R_2$, $R_3$, $R_4$ and $n$ have the significance heretofore described.

The decarboxylation of the ester lactones to produce unsaturated acid esters is further illustrated in the following example:

Example 4

20 grams of methyl pyruvate in 30 cc. of isopropyl ether containing 1 cc. of boron trifluoride etherate catalyst were treated with one mole of ketene at −70° C. The reaction mixture was allowed to warm up slowly to 10° C. The catalyst was neutralized with sodium acetate and filtered out of the solution. The ester lactone thus formed was then decarboxylated by distilling at 100–120° C. at atmospheric pressure, and 8 grams of methyl methacrylate were obtained. The decarboxylation may be shown as follows:

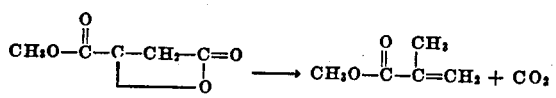

The decarboxylation of the lactones to form unsaturated acid esters may be used as a measure of the amount of lactone formation as made according to Examples 1, 2 and 3.

In accordance with another feature of the invention, the ester lactones may be hydrolyzed in the presence of alkali followed by acidification of the reaction mixture to produce a free acid. The general equation may be shown as follows:

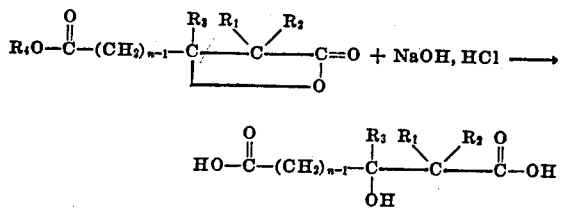

in which $R_1$, $R_2$, $R_3$, $R_4$ and $n$ have the significance heretofore described.

Example 5

43 grams of the lactone of γ-carbomethoxy-β-hydroxy-β-methyl butyric acid, produced as described in Example 2, were hydrolyzed by adding 100 grams of 20% sodium hydroxide followed by acidification of the reaction mixture with hydrochloric acid to give α-methyl-α-hydroxy succinic acid. The reation may be shown as follows:

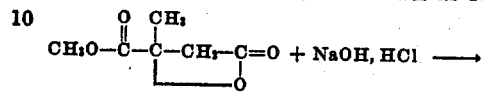

In accordance with still another feature of the invention, the ester lactones may be reacted with an aliphatic alcohol to give the corresponding mono ester of the dicarboxylic acid. The general equation may be shown as follows:

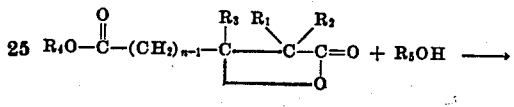

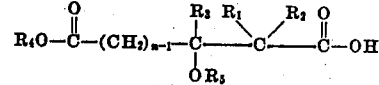

in which $R_1$, $R_2$, $R_3$, $R_4$ and $n$ have the significance described above and $R_5$ is an alkyl group, e. g. methyl, ethyl, etc.

Example 6

43 grams of the lactones of γ-carbomethoxy-β-hydroxy-β-methyl butyric acid, produced as described in Example 2, were reacted with methyl alcohol to produce α-methoxy α-methyl succinic acid ester. The reaction may be shown in the following equation:

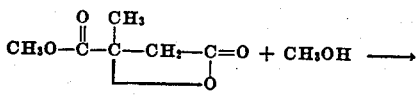

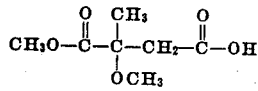

These ester lactones produced by condensing a ketene with an ester of a keto acid can also be reacted with ammonia and amines and with halogen acids to produce valuable compounds.

I claim:
1. The method of forming a lactone having the general structure:

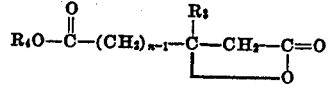

which comprises condensing ketene, $CH_2=C=O$, with an ester of a keto acid having the general structure:

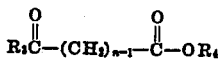

in the presence of a condensation catalyst selected from the group consisting of halides of boron, zinc, aluminum, tin, titanium and iron, in which formulae $R_3$ and $R_4$ each represents a member selected from the class consisting of a hydrogen atom, a methyl group, a benzyl group and a phenylethyl group; and $n$ is a whole number.

2. The method of forming a lactone having the formula:

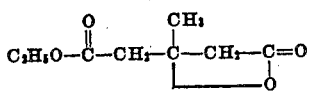

which comprises condensing ketene, $CH_2=C=O$, with ethyl acetoacetate in the presence of a condensation catalyst selected from the group consisting of halides of boron, zinc, aluminum, tin, titanium, and iron.

3. The method of forming a lactone having the formula:

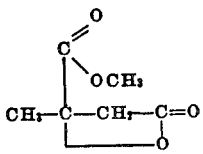

which comprises condensing ketene, $CH_2=C=O$, with methyl pyruvate in the presence of a condensation catalyst selected from the group consisting of halides of boron, zinc, aluminum, tin, titanium, and iron.

4. The method of forming a lactone having the formula:

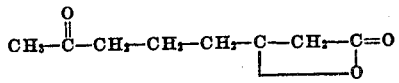

which comprises condensing ketene, $CH_2=C=O$, with methyl levulinate in the presence of a condensation catalyst selected from the group consisting of halides of boron, zinc, aluminum, tin, titanium, and iron.

5. A lactone of the following general formula:

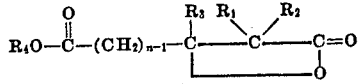

in which formulae $R_1$ and $R_2$ each represents a hydrogen atom; $R_3$ and $R_4$ each represents a member selected from the class consisting of a hydrogen atom, a methyl group, an ethyl group, a phenyl group, a benzyl group and a phenylethyl group; and $n$ is a whole number.

6. A lactone of the following formula:

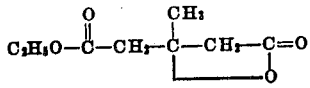

7. A lactone of the following formula:

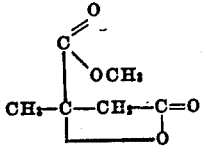

8. A lactone of the following formula:

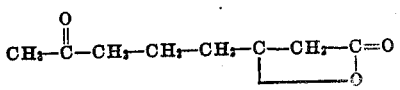

9. The method of forming a lactone having the general structure:

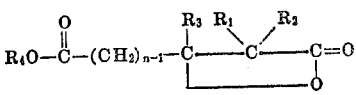

which comprises condensing a ketene having the general structure $R_1R_2C=C=O$ with a compound having the general structure:

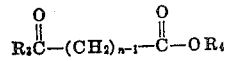

in the presence of a condensation catalyst selected from the group consisting of halides of boron, zinc, aluminum, tin, titanium, and iron, in which formulae $R_1$ and $R_2$ each represents a hydrogen atom; $R_3$ and $R_4$ each represents a member selected from the class consisting of a hydrogen atom, a methyl group, an ethyl group, a phenyl group, a benzyl group and a phenylethyl group; and $n$ is a whole number.

HUGH J. HAGEMEYER, JR.

REFERENCES CITED

The following references are of record in the file of this patent:

UNITED STATES PATENTS

| Number | Name | Date |
|---|---|---|
| 2,281,394 | Sorenson | Apr. 28, 1942 |
| 2,338,144 | Isbell | Jan. 4, 1944 |
| 2,352,641 | Kung | July 4, 1944 |
| 2,356,247 | Kirk | Aug. 22, 1944 |
| 2,356,459 | Kung | Aug. 22, 1944 |
| 2,382,464 | Boese | Aug. 14, 1945 |

OTHER REFERENCES

Hurd et al., J. Am. Chem. Soc., 66, 2013-2014 (1944). Copy in Scientific Library.

Johanson: "Chem. Zentralblatt," vol. 87 (1916), p. 557.

Staudinger: "Annalen der Chem.," vol. 356 (1907), pp. 63-4.

"Berichte," vol. 42 (1909), pp. 4707-8 (Fichter et al.).

Staudinger: "Hel. Chem. Acta," vol. 4 (1921), p. 9.